(12) United States Patent
Rupp et al.

(10) Patent No.: US 11,247,175 B2
(45) Date of Patent: Feb. 15, 2022

(54) THERMALLY STERILIZABLE FLUID FILTER AND USE OF THE THERMALLY STERILIZABLE FLUID FILTER

(71) Applicant: MANN+HUMMEL GmbH, Ludwigsburg (DE)

(72) Inventors: Heike Rupp, Kirchheim am Neckar (DE); Michael Fasold, Auenwald (DE); Herbert Jainek, Heilbronn (DE); Sascha Bauer, Auenwald (DE); Frank Ehlen, Neunkirchen (DE); Stefan Kunze, Tuebingen (DE); Jasmin Sorg, Schwieberdingen (DE); Karlheinz Muenkel, Oberderdingen-Flehingen (DE); Steffen Schuetz, Bietigheim-Bissingen (DE); Ulrich Dehnen, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 121 days.

(21) Appl. No.: 16/594,363

(22) Filed: Oct. 7, 2019

(65) Prior Publication Data
US 2020/0030747 A1    Jan. 30, 2020

Related U.S. Application Data

(63) Continuation of application No. PCT/EP2018/058907, filed on Apr. 6, 2018.

(30) Foreign Application Priority Data

Apr. 7, 2017 (DE) ..................... 10 2017 003 405.2
Sep. 28, 2017 (DE) ..................... 10 2017 009 072.6

(51) Int. Cl.
*B01D 61/18* (2006.01)
*B01D 61/14* (2006.01)
(Continued)

(52) U.S. Cl.
CPC ........... *B01D 61/18* (2013.01); *B01D 61/145* (2013.01); *B01D 63/02* (2013.01); *B01D 71/02* (2013.01)

(58) Field of Classification Search
CPC .... B01D 61/18; B01D 61/145; B01D 61/027; B01D 61/147; B01D 63/02; B01D 71/02;
(Continued)

(56) References Cited

U.S. PATENT DOCUMENTS 4,906,365 A * 3/1990 Baumann ............... B01D 29/96
                                                    210/238
2004/0182777 A1* 9/2004 Stankowski ......... B01D 63/024
                                                    210/455

(Continued)

FOREIGN PATENT DOCUMENTS

CN       204799114 U       11/2015
CN       204942827 U        1/2016
(Continued)

OTHER PUBLICATIONS

Kneifel (DE 4401014) machine translation (Year: 1994).*

*Primary Examiner* — Liam Royce

(57) ABSTRACT

A thermally sterilizable fluid filter (10) for concentrating substances contained in a fluid by way of micro-, nano- or ultrafiltration of the fluid, particularly for concentrating a pharmaceutical precursor and/or intermediate, in particular a vaccine, in a fluid. The fluid filter has a filter housing with a fluid inlet, a retentate outlet and a permeate outlet. A filter cartridge is arranged in the filter housing (12) and has a filter medium of a ceramic material and/or a ceramic composite material. The filter cartridge is held with axial play on the filter housing.

17 Claims, 7 Drawing Sheets

(51) Int. Cl.
*B01D 63/02* (2006.01)
*B01D 71/02* (2006.01)

(58) Field of Classification Search
CPC .......... B01D 2313/025; B01D 2313/04; B01D 2321/08; B01D 65/022
See application file for complete search history.

(56) References Cited

U.S. PATENT DOCUMENTS

| | | |
|---|---|---|
| 2015/0136689 A1 | 5/2015 | Butters et al. |
| 2016/0074795 A1 | 3/2016 | Prehn et al. |

FOREIGN PATENT DOCUMENTS

| | | |
|---|---|---|
| DE | 2400020 A1 | 7/1974 |
| DE | 2513751 A1 | 10/1975 |
| DE | 2656696 A1 | 6/1977 |
| DE | 4401014 A1 | 7/1994 |
| DE | 60105288 T2 | 9/2005 |
| EP | 1333086 A1 | 8/2003 |
| JP | 2003251164 A | 9/2003 |
| JP | 2009090246 A | 4/2009 |
| JP | 2016007573 A | 1/2016 |
| JP | 2016013519 A | 1/2016 |
| WO | 2009023332 A2 | 2/2009 |

\* cited by examiner

THERMALLY STERILIZABLE FLUID FILTER AND USE OF THE THERMALLY STERILIZABLE FLUID FILTER

TECHNICAL FIELD

The invention relates to a thermally sterilizable fluid filter for concentrating substances or mixtures of substances contained in a fluid, in particular by way of micro-, nano- or ultrafiltration of the fluid.

Such fluid filters are used, for example, in the concentration and in the purification of pharmaceutical precursors or intermediates. However, the application is not limited to this; further applications may be in the production of life science products such as cosmetics or in the processing of foodstuffs.

BACKGROUND

In order to meet high hygiene standards, it is provided to sterilize such fluid filters often thermally, in particular by means of steam sterilization. By temperature changes in the sense of a defined heating and cooling during the thermal sterilization, thermally induced stresses occur within the fluid filter, for example in the area of seals or bonds. Especially with filters which comprise a filter candle or filter cartridge which have a different thermal expansion coefficient from the housing material, thermally induced damage to the filter cartridge can result, and this is particularly the case with filter cartridges with ceramic hollow fibers; this can lead to fiber breaks. As a result, known fluid filters generally only have a short service life.

From JP 2003 2511 64 A, a ceramic hollow fiber module is known. The ceramic hollow fiber module has regularly arranged inlet/outlet openings in order to reduce thermal stresses in its filter housing, in particular in the filtration of gases. Furthermore, a gas pressure test module is described, in the housing of which two O-rings are arranged, which contact the ceramic hollow fiber module in a radially circumferential manner.

Furthermore, from DE 25 13 751 B2, an ultrafiltration module is known, which has a hollow fiber bundle accommodated in a housing, which is provided in each case terminally with a sealing head. The hollow fiber bundle is sealed with its sealing heads at both longitudinal ends via an O-ring relative to the housing. Such an ultrafiltration module is disadvantageous for both high temperature applications and for thermal sterilization; due to the longitudinally rigid seal, damage may occur to the hollow fibers in case of different thermal expansions of the housing and the hollow fiber bundle.

DISCLOSURE OF THE INVENTION

The object of the invention is therefore to improve a generic fluid filter such that it is suitable for high-temperature applications and/or thermal sterilization.

The object is thus achieved by a fluid filter for purifying substances contained in a fluid, in particular by way of micro-, nano- or ultrafiltration of the fluid,
  with a filter housing having a fluid inlet, a retentate outlet and a permeate outlet;
  with a filter cartridge arranged in the filter housing, which filter cartridge extends in an axial direction to the longitudinal axis of the filter housing and which comprises a filter medium, which comprises a ceramic material and/or a ceramic composite material; and
  with at least one, preferably elastically deformable, sealing ring which abuts the filter cartridge circumferentially sealingly in the radial direction and over which the filter cartridge is arranged held with axial play on the filter housing.

Due to the design features described above, the fluid filter is particularly well suited to being thermally sterilized; however, as part of a cleaning process, a chemical cleaning component, especially rinse with potassium hydroxide solution or citric acid, can be used, which aims to provide a low or high pH environment.

Purification can be understood to mean two things: a) Concentration of a desired product within the filter cartridge, i.e. in the retentate, or b) Retention of a defective product within the filter cartridge, i.e. the desired product is present in the permeate.

The fluid may preferably be liquid at the operating temperature of the fluid filter in filter operation. The fluid may consist of a carrier substance, for example water, into which the substances to be purified, in particular to be concentrated, are taken up. Preferably, the carrier substance may be a liquid. Depending on the nature of the substances, the fluid can then be in particular a liquid, a suspension or an emulsion. The fluid can be, for example, water with the substances to be purified, in particular to be concentrated.

Substances contained in the fluid may in particular be pure substances or mixtures of substances with the exception of the carrier substance, for example one or more different pure substances. In particular, as substances, high molecular weight, for example more than 50 kDa, compounds and/or mixtures of high molecular weight compounds, such as proteins, genetic material, microorganisms and/or parts of microorganisms may be provided. However, by nanofiltration, low molecular weight compounds, such as certain sugars, may be processed.

The fluid filter comprises a fluid inlet into which the fluid to be filtered can be fed. The fluid filter can separate the fed-in fluid into a permeate and a retentate. The permeate can be withdrawn via the permeate outlet. The retentate can be withdrawn via the retentate outlet. In this case, the term "retentate" is understood to mean the fraction of the fluid which is concentrated in terms of the substances, and "permeate" is understood to mean the fraction of the fluid reduced in terms of the substances. As an alternative to this mode of operation, a quasi-inverse mode of operation is also possible: for example, cell fragments can be retained in the retentate, while the molecular product of value is present in the permeate.

The filter cartridge may be formed as a preferably replaceable insert for installation in the filter housing. In particular, the filter cartridge comprises the filter medium. The filter medium may be traversed by the fluid for filtering the fluid or for concentration in the filter operation. The filter medium is formed of a ceramic material and/or a ceramic composite material. These materials are particularly suitable as filter materials for micro-, ultra- and nanofiltration. Alternatively, it is possible that the filter medium consists of or comprises a polymer, a metal or a metal alloy.

The sealing ring is preferably elastically deformable; it can be made of silicone, ethylene-propylene-diene rubber (EPDM), which is advantageous in terms of the expected temperatures in the range of 135° C. and the exposure time in a steam sterilization. Also, these materials are resistant to chemical cleaning agents such as the aforementioned citric acid and/or potassium hydroxide solution.

The axial play may be provided at one or both ends with respect to the filter cartridge. To form the axial play, the filter cartridge can preferably be supported only in one or two, in particular limited, sections on the filter housing. Through the sealing ring, a centric mounting of the filter cartridge or filter candle can be additionally made possible; this is thereby stabilized in the radial direction.

In particular for sterilization, the fluid filter can be thermally sterilized, preferably steam-sterilized. In this case, according to the invention, usually occurring mechanical stresses, in particular thermally-induced stresses in the filter cartridge, are avoided in that the filter cartridge is held on the filter housing by means of the sealing ring with axial play. In other words, the filter cartridge at any time, even with temperature fluctuations, is kept substantially stress-free in the filter housing. The fluid filter can thus have a particularly high thermal capacity. The fluid filter can therefore achieve a particularly long service life even with frequent thermal sterilization, in particular steam sterilization.

By at least one of the two sealing rings, an overpressure range of the fluid filter which can be pressurized with the fluid can be sealed against a permeate collection chamber of the fluid filter, which permeate collection chamber preferably engages around the filter cartridge in the radial direction on the outside, preferably annularly, and/or engages through the filter cartridge. The overpressure region may in particular be formed by the fluid inlet or in the region of the fluid inlet. Thus, a flow short circuit, in particular between the fluid inlet and the permeate collection chamber and/or the permeate outlet, can be avoided within the fluid filter.

It is also conceivable that the sealing ring, which is associated in particular with the fluid inlet, comprises a sealing lip which can be pressed against the filter cartridge by the fluid, in particular in a pressure-proportional manner to an operating pressure of the fluid prevailing in the overpressure region of the fluid filter. In particular, the sealing ring may be designed to be pressure-proportionally sealing. As a result, the fluid filter can be operated in filter mode with high operating pressure in the overpressure range. The contact pressure of the sealing lip in the filter operation can thus be increased. As a result, both the sealing and the retaining action of the sealing ring in the filter operation can be improved. A thermal sterilization, in particular a steam sterilization, can be carried out at a lower operating pressure. Thus, the contact pressure and/or the retaining action of the sealing ring during sterilization may be reduced. Thus, thermally induced stresses during sterilization, especially in the filter cartridge, can be further reduced. In a further embodiment, the sealing ring can also comprise more than one sealing lip, for example a sealing lip which extends radially inwards and abuts the filter cartridge, and a sealing lip which extends radially outwards and abuts the housing sealingly.

For this purpose, it may be particularly advantageous to form the sealing ring, in particular the sealing ring associated with the fluid inlet, in a pressure-proportionally sealing manner. A retaining effect sufficient to hold the entire filter cartridge can be ensured by the other sealing ring, even during sterilization.

In a preferred embodiment, it can be provided that adjacent to the sealing ring, in particular adjacent to the sealing ring with sealing lip, a retaining ring is arranged radially between the filter housing and the filter cartridge. The retaining ring has a plurality of retaining bulges distributed over its circumference, which extend from a first radius to a second radius, wherein the retaining ring is formed to support the filter cartridge radially inwardly in a retaining region on an outer lateral surface and radially outwardly abut against the filter housing. The retaining bulges of the retaining ring extend in an embodiment from radially outward to radially inward, so that they are supported in the retaining region on an outer lateral surface of the filter cartridge. In another embodiment, it may be provided that the retaining bulges extend from radially inward to radially outward, so that the retaining bulges come to rest against the filter housing. However, the extension of the retaining bulges does not have to be strictly radial, but may be at any angle; what is functionally important is only that they extend from the first to the second radius, wherein the first radius can be either inside or outside depending on the embodiment relative to the second radius. It can also be provided that the retaining ring has both retaining bulges which extend radially inwardly and retaining bulges extending radially outward.

The retaining ring fulfills the function to absorb the supporting forces acting on the filter cartridge, so that they are not introduced or only introduced to a reduced extent in the sealing ring with sealing lip. In particular, in a horizontal installation position of the filter cartridge, there is otherwise the risk that the lip seal is deformed due to the weight of the filter cartridge and thus a centric alignment of the filter cartridge is no longer given. If the gap between the filter housing and the filter cartridge is not sufficiently small, it may cause a leak. The retaining ring prevents exactly this by absorbing the supporting forces and substantially keeping them away from the lip seal, so that by this measure, a further improved sealing effect, even in a horizontal position, can be achieved.

In short: the retaining ring absorbs supporting forces in order to avoid high lateral forces caused by constraints. Due to the retaining bulges, which preferably have only a punctual contact or line contact with the filter cartridge, a slight axial longitudinal movement of the cartridge is ensured, which is required in particular due to different thermal expansion of the filter housing to the filter cartridge under the influence of temperature to avoid unwanted axial force effects on the filter cartridge. This is especially important when using a brittle ceramic material as a filter medium, in particular in the form of hollow fibers, in order to achieve thermal sterilizability.

Furthermore, the retaining ring may be made of a plastic material, in particular an elastomer, or metal and/or the retaining bulges may be in the form of nubs, noses or tongues, in particular spring tongues. Alternatively or additionally, it may be provided that the retaining bulges extend radially inward to an inner circumference whose diameter is equal to or greater than a diameter of the filter cartridge in the retaining region in a non-compressed or undeformed non-assembled state; so that in this way it is made possible that the retaining ring absorbs forces only via its retaining bulges when a maximum permissible deformation of the lip seal is exceeded. In the case of an exactly coaxial alignment of filter cartridge and sealing ring with sealing lip, therefore, there will be an at least small gap between the inner circumference with the retaining bulges and the retaining region of the filter cartridge. The width of this gap is a matter of interpretation and depends on the maximum deformation tolerable by the sealing ring with sealing lip.

Alternatively, however, it may also be provided that the retaining bulges extend radially inward to an inner circumference whose diameter in a non-compressed or undeformed non-assembled state is smaller than a diameter of the filter cartridge in the retaining region (undersize), so that an elastic prestressing of the cartridge is achieved. This has the advantage that a centering function is also fulfilled by the retaining ring, so that the lip seal is also released from this.

The retaining ring may, for example, be an O-ring, which has distributed over its inner circumference the retaining bulges in the form of nubs; this has the advantage that the retaining ring can be produced just as easily as an O-ring with a simple geometry, since only one mold has to be produced, and the production is otherwise possible in one production step. If it is a retaining ring made of metal, this may, for example, be in the form of a securing ring, as used for shafts without circumferential groove, or as a spring ring. In particular, the retaining ring having a circumferentially continuous sleeve-shaped support region, with which it is supported either on the inner circumference of the filter housing or the retaining portion of the filter cartridge, and also spring tongues extending radially away therefrom in the axial direction, depending on the design, extending either to the retaining region of the filter cartridge or to the inner periphery of the filter housing. Such a metallic retaining ring offers the advantage of being very resistant to aging; in particular, in a formation in stainless steel, this has excellent chemical and thermal resistance. In a preferred embodiment, the metallic retaining ring is slotted, preferably completely slotted so that it has an open cross-section. This has the advantage that the retaining ring can be made easily and inexpensively from a strip material, wherein the bulges and/or spring tongues can be obtained simply by punching and bending.

According to a particularly preferred embodiment of the invention, it can be provided that radially between the filter cartridge and the filter housing in the region in which the sealing ring sealingly abuts the filter cartridge, an annular gap is present, which preferably comprises a width of at least 0.4 mm, particularly preferably 0.8 mm. The gap may also be wider, preferably about more than 1.5 mm; depending on the diameter of the holding heads/size of the filter cartridge even larger gap widths can be useful, for example up to several millimeters.

Due to this comparatively wide gap, a certain tilting of the filter cartridge in the filter housing is made possible in a targeted manner without any transverse forces or bending moments acting on the filter cartridge, in particular on its ceramic hollow fiber bundle. As a result, the tolerances occurring in the manufacturing process of the filter cartridge can be compensated accordingly.

Furthermore, the fluid filter can have at least one second sealing ring, which abuts the filter cartridge sealingly in the radial direction and via which the filter candle is held on the filter housing. In a preferred embodiment, the second sealing ring provides no axial mobility, and keeps the filter cartridge stationary relative to the filter housing. Preferably, the second sealing ring is arranged on the axial end of the filter cartridge facing away from the first sealing ring and holds the filter cartridge, in particular non-positively, in a predetermined axial position relative to the housing; for this purpose, the sealing ring can be pressed at least radially onto a lateral surface of the filter cartridge, in particular a lateral surface of a holding head.

Alternatively or additionally, it may be provided that at least one of the two sealing rings, preferably both sealing rings, comprise a rubber-elastically deformable material, in particular an elastomer. Such seals are particularly inexpensively available.

In an alternative embodiment, at one end of the filter cartridge (seen in the longitudinal direction) a sealing ring can be dispensed with and instead the holding head of the filter cartridge may be provided with a radially projecting collar, which can be clamped sealingly between the cover and housing. This results in a "fixed support" at this axial end. This is particularly advantageously possible if the material of the holding head consists of a sufficiently elastically deformable material.

It can also be provided that the filter housing is designed in several parts and preferably has a sleeve-shaped or pot-shaped housing part with a first end-side housing opening, wherein preferably a cover is arranged on the housing opening. Thus, individual parts of the filter housing can be produced inexpensively and are easily assembled. The assembly can be done gradually, in particular, the filter cartridge can be introduced into the filter housing. It can be provided in particular that at least one of the individual parts of the filter housing is detachably connected to the rest of the filter housing. Then the filter cartridge can also be easily replaced later. The sealing concept also allows the stress-free introduction or assembly of the filter cartridge in the filter housing, which is particularly advantageous when using brittle materials such as ceramic as a filter medium.

It is particularly advantageous when the housing part is sleeve-shaped and both ends comprise an end-side housing opening, wherein a cover is arranged at each of the two housing openings. Thus, the filter cartridge can be inserted via one of the two housing openings for mounting in the housing part. Subsequently, at least one of the covers can be arranged on the corresponding housing opening.

It is particularly advantageous if at least one of the two sealing rings is arranged in sections between the housing part and one of the covers and abuts the cover and the housing part sealingly in the axial and/or radial direction. Alternatively or additionally, the retaining ring may be at least partially arranged between the housing part and one of the covers and sealingly abut the cover and the housing part in the axial and/or radial direction.

Thus, at least one of the two sealing rings and/or the retaining ring also seals the cover against the housing part.

It is also conceivable that a third sealing ring is arranged axially sealingly between the housing part and a cover, preferably a cover associated with the fluid inlet. Thus, for example, the sealing ring having a sealing lip seals the filter cartridge radially against the housing part and the third sealing ring seals the housing part axially against the cover.

It can be provided that at least one of the sealing rings is designed as an O-ring. In particular, a sealing ring assigned to the retentate outlet can be designed as an O-ring. O-rings are formed structurally simply and are available inexpensively. The O-ring can be arranged with respect to the housing part and the cover in particular so that the cover is pressed axially and radially inwardly, resulting in an axial fixing of the filter cartridge relative to the housing part.

It is also conceivable that the filter cartridge comprises a hollow fiber bundle, in particular a ceramic hollow fiber bundle. Such a hollow fiber bundle is particularly suitable for micro-, nano- or ultrafiltration. Due to the fluid filter according to the invention, thermally induced mechanical stresses are avoided from the outset, so that even with a filter cartridge having a ceramic hollow fiber bundle there is only a small risk of breakage.

It is also conceivable that the hollow fiber bundle is fixed at least at one end (seen in the longitudinal direction), preferably at both ends (seen in the longitudinal direction), on or in a holding head. According to this embodiment, it can be provided in particular that the preferably rubber-elastically deformable sealing ring circumferentially sealingly abuts the holding head in the radial direction and allows an at least axial play of the holding head relative to the filter housing. If it is an embodiment with a retaining ring, it can be provided, in particular, that the retaining ring also abuts the holding head, in particular on a lateral surface of the retaining head, in particular with its retaining bulges, in order to absorb the supporting forces. The retaining region is in this case on the holding head. The holding heads are often referred to as "potting", since these are usually prepared by allowing a liquid starting material to cure.

As a result, the hollow fiber bundle and thus the filter cartridge can be made permanently stable. In this case, the, preferably elastically deformable sealing ring is located on a lateral surface of a holding head. In particular, the holding head can be easily moved in the axial direction with respect to the sealing ring with sealing lip to compensate for, as described, thermally induced relative changes in length relative to the housing.

Another important aspect lies in the production-related concentricity offset of the ceramic membrane cartridge from the first holding head/potting to the second holding head/potting on an opposite side of the filter cartridge. Since the sealing and support of the filter cartridge, especially when using ceramic hollow fibers, must be performed while avoiding lateral forces/constraints, the lip seal is designed to be accordingly soft, which in turn means that the lip seal can no longer assume a support function from a certain concentric offset or deflection without being damaged and thus causing a leak. This radial deflection of the lip seal beyond a permissible maximum dimension is avoided by the retaining ring, while the absolutely necessary axial mobility is maintained undiminished.

It is also conceivable that at least one holding head is formed of a plastic, in particular of epoxy resin or polyurethane. However, it is also possible to use thermoplastics, in particular high-temperature-resistant thermoplastics, in particular polyoxymethylene (POM). The holding head can be produced by introducing the hollow fiber bundle into a molten plastic and then curing.

It can be provided that at least one holding head seals the permeate collection chamber against the fluid inlet and/or against the retentate outlet. The seal can also take place in cooperation with at least one of the sealing rings. In particular, the cross-section of the holding head can essentially correspond to that of the housing part or of the cover, in the region of which the holding head is located.

It can be provided that the filter housing is wholly or partly made of stainless steel. Stainless steel is a material that is particularly suitable for applications with high hygiene standards.

The scope of the invention furthermore includes the use of a previously described fluid filter for concentrating a pharmaceutical precursor and/or intermediate product, in particular a vaccine, in a fluid. In the field of vaccines, the fluid filter can be used in particular for the concentration of animal vaccines. In general, the fluid filter according to the invention can be used particularly advantageously in areas in which high hygiene standards are to be observed and/or thermal sterilizations are carried out, in particular carried out frequently. For example, the fluid filter can also be used in the field of food processing. The fluid filter has a pronounced resistance to thermal fluctuations. Thus, the fluid filter can be thermally sterilized, in particular by steam sterilization, without the risk of damage or even destruction of the filter cartridge.

In a further variant of the use according to the invention, the permeate can also be recycled. In particular, the permeate can be fed back into a production area, for example a bioreactor, in which the fluid to be filtered is produced. Thus, a loss of precursor or intermediate product contained in the permeate, here of vaccine, can be avoided. Of course, with regard to the alternative operating mode already described above, the retentate can also be recycled accordingly.

BRIEF DESCRIPTION OF THE DRAWINGS

Further features and advantages of the invention will become apparent from the following detailed description of exemplary embodiments of the invention, with reference to the figures of the drawing, which show details essential to the invention, and from the claims.

The individual features may be implemented individually for themselves or in several combinations in variants of the invention.

Figure 1:
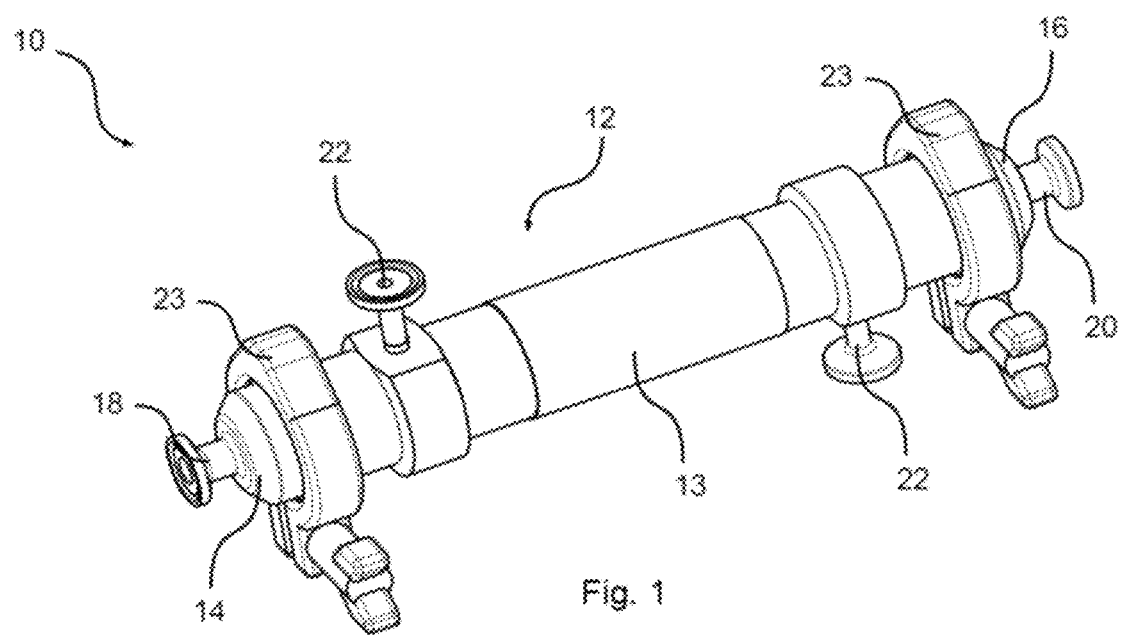

In the schematic drawing, embodiments of the invention are shown, which are explained in more detail in the following description.

Figure 2:
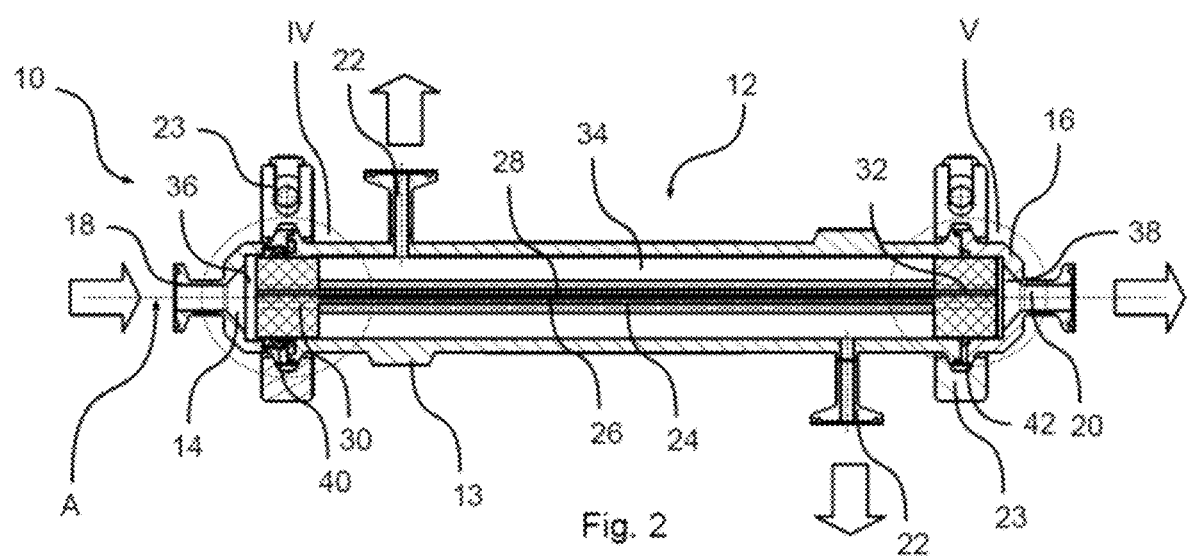
Figure 3:
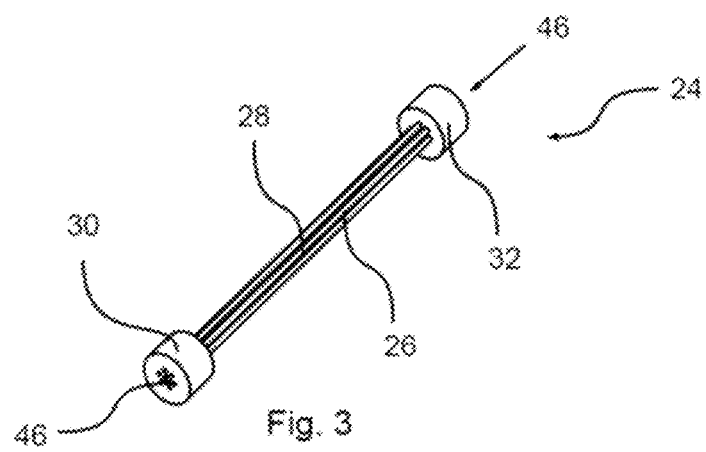
Figure 4:
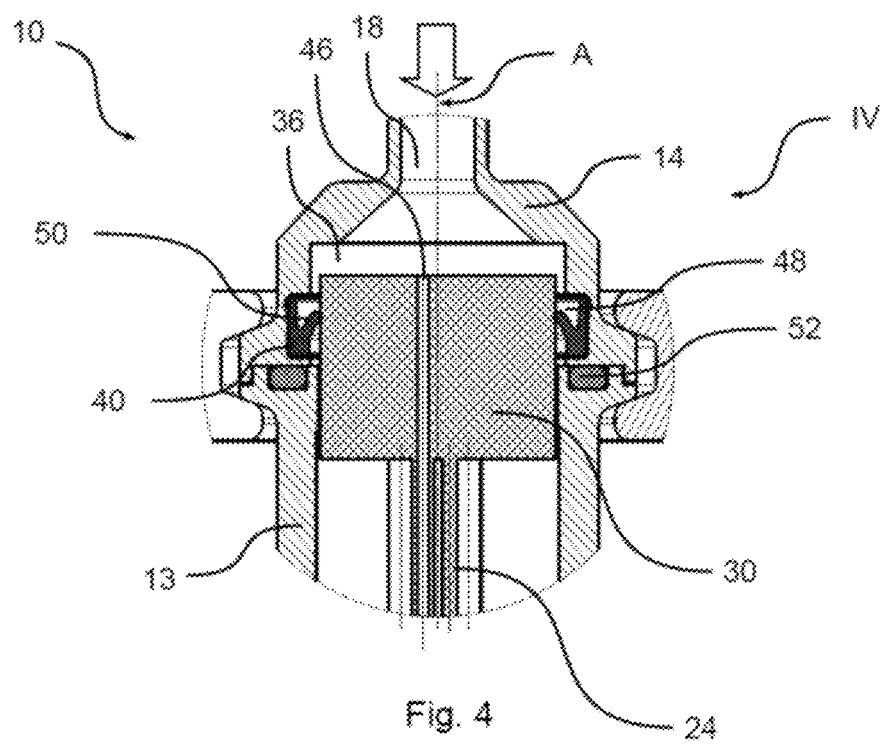
Figure 5:
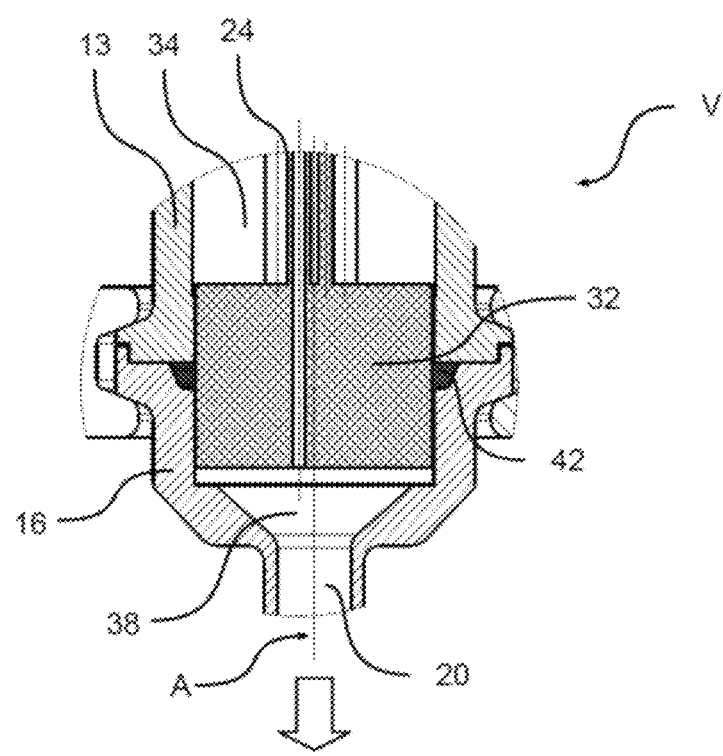
Figure 6:
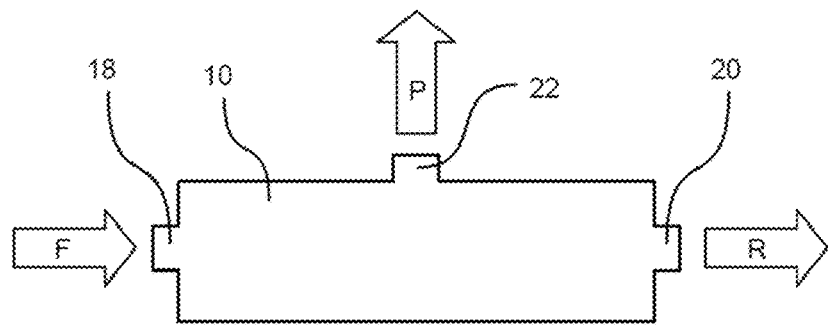
Figure 7:
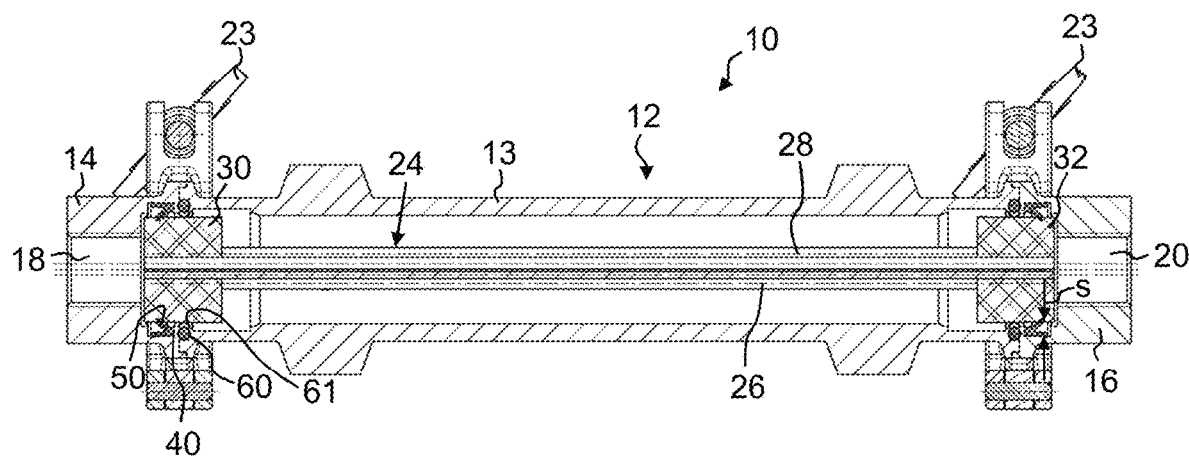
Figure 8:
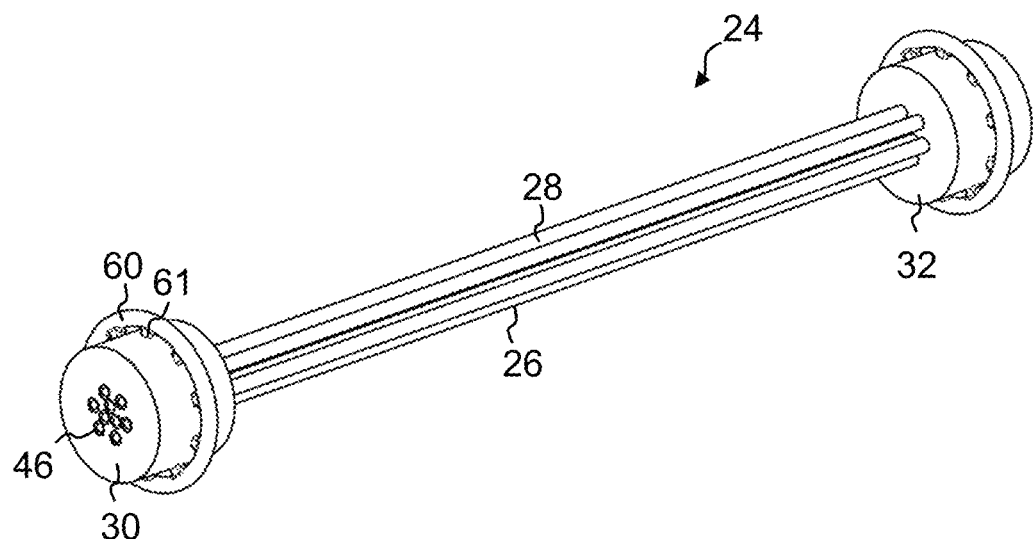
Figure 9:
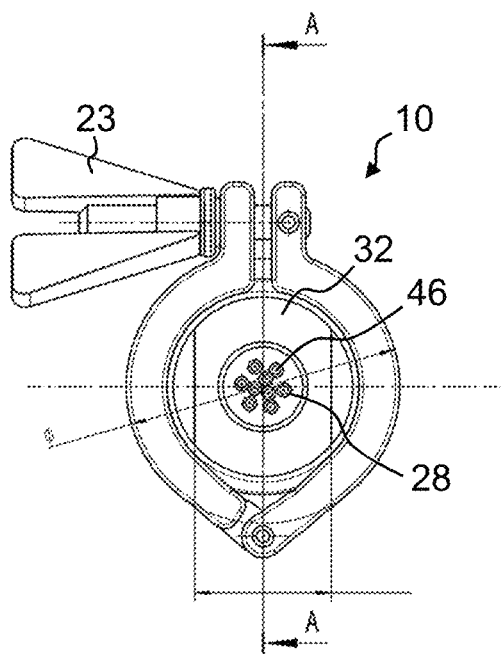
Figure 10:
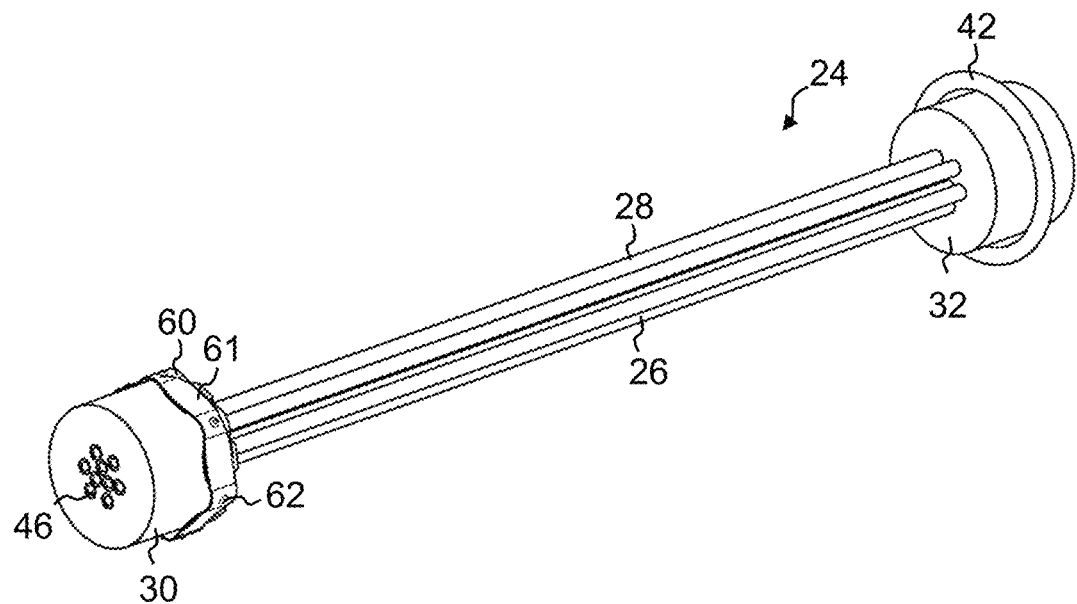
Figure 11:
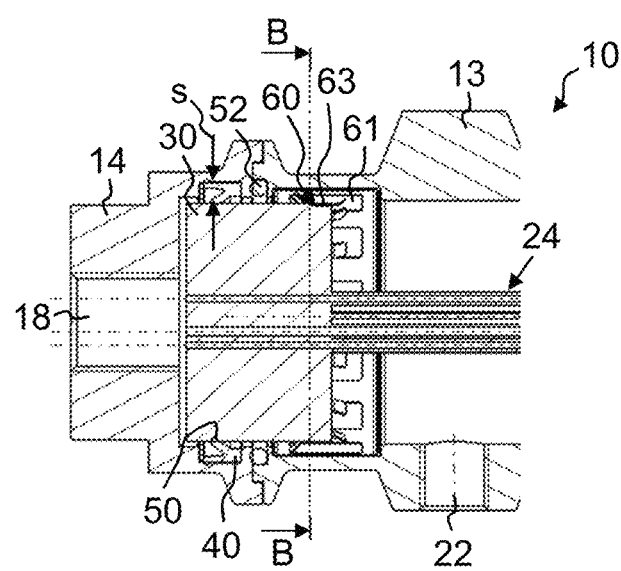
Figure 12:
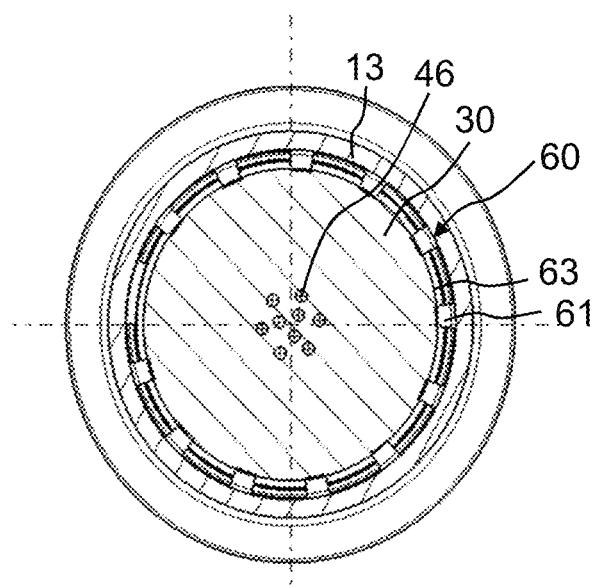
Figure 13:
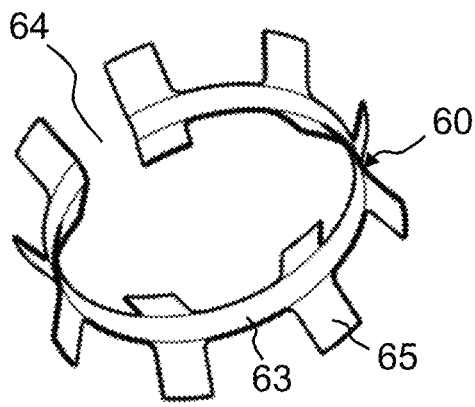
Figure 14:
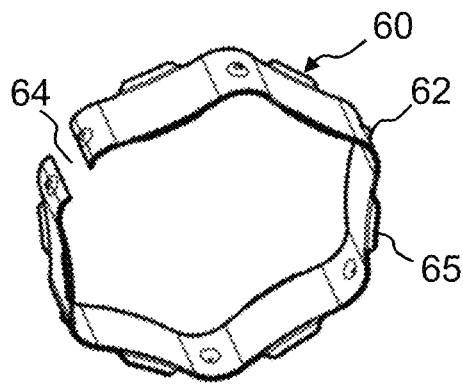
Figure 15:
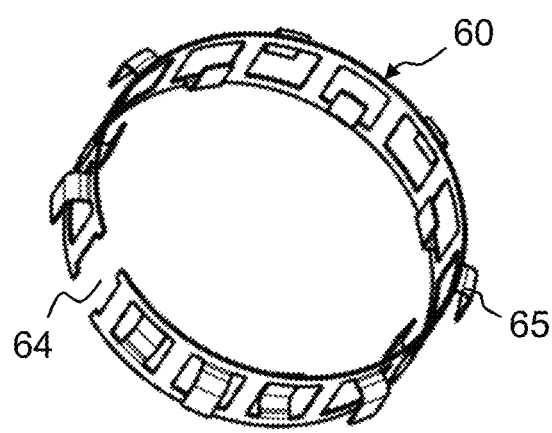
Figure 16:
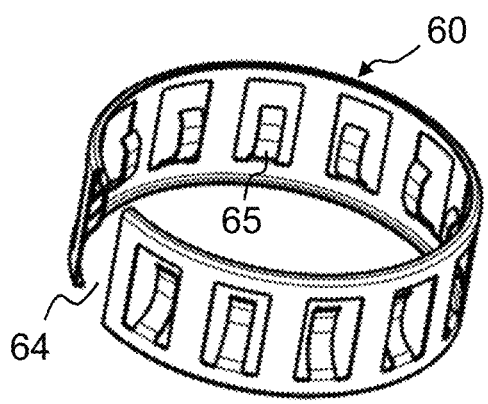
Figure 17:
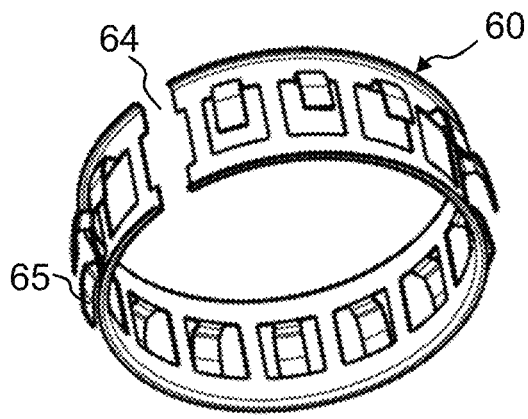

In the drawings:

FIG. 1 shows a fluid filter in perspective view from the outside;

FIG. 2 is a longitudinal sectional view of the fluid filter of FIG. 1;

FIG. 3 shows a filter cartridge with a hollow fiber bundle in a perspective view;

FIGS. 4 and 5 are detailed views of the end regions of the fluid filter of FIG. 1 in longitudinal section;

FIG. 6 is a schematic representation of a use of a fluid filter;

FIG. 7 is a longitudinal sectional view of a further embodiment of the fluid filter with retaining rings;

FIG. 8 is an isometric view of a filter cartridge according to another embodiment of the fluid filter;

FIG. 9 is a side view of the fluid filter according to another embodiment;

FIG. 10 is an isometric view of a filter cartridge according to still another embodiment of the fluid filter;

FIG. 11 is a detail of a longitudinal sectional view of a fluid filter according to still another embodiment;

FIG. 12 is a cross-sectional view B-B according to FIG. 11; and

FIGS. 13 to 17 show exemplary embodiments for retaining rings formed as spring rings according to still another embodiment of the fluid filter.

EMBODIMENT(S) OF THE INVENTION

FIG. 1 shows a fluid filter 10 in a perspective view. The fluid filter 10 has a multi-part filter housing 12 with a sleeve-shaped housing tube 13. At the end-side housing openings, an inlet cover 14 and a retentate cover 16 are arranged in each case. The inlet cover 14 has a nozzle-shaped fluid inlet 18. The retentate 16 has a retentate outlet 20, which is also formed nozzle-shaped. On the housing tube 13 are two permeate outlets 22, which are welded on in the embodiment shown. The permeate outlets 22 are formed nozzle-shaped.

At least one clamp 23 is provided, preferably a plurality of clamps 23, for attachment of the fluid filter 10. The clamp(s) 23 surrounds or surround the filter housing 12. Their diameter is dimensioned such that the fluid filter 10 can be fixed substantially tension-free in the clamp or clamps 23. In addition, the clamps 23 fulfill the task of pressing the cover 14, 16 in the axial direction on the housing tube 13; this is achieved by an internal, axially mutually conical or chamfered circumferential groove on the inner lateral surface of the clamps 23, whereby an axial compression can be generated when tightening the clamps 23.

In this embodiment, the housing tube 13 and the cover 14, 16 are made of stainless steel. Furthermore, the fluid inlet 18, the fluid outlet 20, the permeate outlets 22 and/or the clamps 23 may also be made of stainless steel.

FIG. 2 shows the fluid filter 10 of FIG. 1 in longitudinal section. It can be seen first that the filter housing 12 forms an interior with the housing tube 13 and the covers 14, 16.

The fluid filter 10 is elongated and has a longitudinal axis A defining an axial direction.

A filter cartridge 24 is arranged in the interior. The filter cartridge 24 comprises two holding heads 30, 32, between which a filter medium 26 is fixed. The filter medium 26 comprises a hollow fiber bundle 28. The hollow fiber bundle 28 comprises a ceramic material and is in particular formed as a ceramic hollow fiber bundle.

A permeate collection chamber 34 is formed between the two holding heads 30, 32 and the housing tube 13. The permeate collection chamber 34 is fluidly connected to the permeate outlets 22. In this exemplary embodiment, the permeate collection chamber 34 engages around and passes through the filter cartridge 24 or the filter medium 26 in the region of the hollow fiber bundle 28. In an alternative embodiment, in particular if the filter medium 26 is formed as a volume body, the permeate collection chamber 34 surrounds the filter medium 26 in the radial direction on the outside and, for example, in an annularly circumferential manner.

It can also be seen that the fluid filter 10 comprises a fluid inlet region 36 in the region of the fluid inlet 18. In the region of the retentate outlet 20, the fluid filter 10 comprises a retentate outlet region 38. The fluid or retentate entering through the fluid inlet 18 collects in the regions 36, 38.

It can be seen that the two holding heads 30, 32 separate the permeate collection chamber 34 from the fluid inlet region 36 and the fluid inlet 18 as well as from the retentate outlet region 38 and the retentate outlet 20. For this purpose, the holding heads 30, 32 are arranged in a cross-section filling manner in the filter housing 12.

Thus, during filter operation, a fluid to be filtered may enter the fluid filter 10 via the fluid inlet 18. Via the fluid inlet region 36 and the holding head 30, the fluid enters the hollow fiber bundle 28. There, the fluid is split due to the filter properties of the hollow fiber bundle 28 into a permeate and a retentate. The permeate exits the hollow fibers of the hollow fiber bundle 28 on the wall side and thus enters the permeate collection chamber 34. The permeate can then be removed via the permeate outlets 22.

By contrast, the retentate flows through the filter cartridge 24 over the length of the hollow fiber bundle 28 until it enters the retentate outlet region 38 on the holding head 32 and exits there via the retentate outlet 20.

Since the permeate is separated from the fluid in this way, the retentate is concentrated, for example, with respect to the initial fluid. In filter operation, the fluid filter 10 or the fluid inlet 18 can be acted upon by an overpressure, for example in the range from 4 to 8 bar.

For sterilization, the fluid inlet 18 is supplied with superheated steam. In this case, the pressure of the superheated steam can be kept lower than the operating pressure in the filter mode. Despite lower pressure, the steam can pass completely through the entire fluid filter 10 and, in particular, the filter cartridge 24 or can flow completely through it for sterilization. The superheated steam may alternatively or additionally be supplied or removed by one or both of the permeate outlets 22 and/or the fluid outlet 20.

In this embodiment of the invention, the filter cartridge 24 is wholly or—preferably—partially arranged with axial play along the longitudinal axis A in the filter housing 12.

For this purpose—as will be described in more detail in FIGS. 4 and 5—the filter cartridge 12 is fixedly supported on its holding head 32 substantially by a sealing ring 42 arranged on the retentate outlet side. This fixed support is achieved by an arrangement of the sealing ring 42 in a substantially conical or chamfered sealing groove on the side of the cover 16, which results in an axial-radial compression of the sealing ring 42 when assembling the housing parts 13, 16 and thus leads to an axial fixing of the filter cartridge 24 with respect to the housing 12. On the other hand, the filter cartridge 24 is supported in a floating manner on a sealing ring 40 arranged on the fluid inlet side, i.e. it is supported with significant axial play. If, therefore, there is a longitudinal expansion due to, for example, a temperature change of the filter cartridge 24, the holding head 30 can shift along the longitudinal axis A. In this case, the axial play available to the filter cartridge 24 is dimensioned such that, even at the highest permitted operating temperature, the holding head 30 remains free to move.

This ensures that the filter cartridge 24 is at any time is not exposed or not substantially exposed to any mechanical, in particular temperature-induced, stresses. Even if the—ceramic—filter medium 26 has a particularly high brittleness, breakage due to the axial play is reliably avoided.

FIG. 3 shows the filter cartridge 24 in a perspective view. The hollow-fiber bundle 28, which is delimited at the ends by the holding heads 30, 32, can be seen once again. In this embodiment, the hollow fiber bundle 28 has nine ceramic hollow fibers. These pass through openings 46 through the holding heads 30 and 32, respectively.

In this embodiment, the radial outer sides of the holding heads 30, 32 are formed as sealing surfaces. In particular, in this embodiment, the outer sides are equipped with an additional sealing material.

The holding heads 30, 32 are made of plastic, in particular epoxy resin. In particular, the holding heads 30, 32 are made by embedding the hollow fiber bundle 28 in the plastic, in particular casting the hollow fiber bundle therein, and after curing, trimming the side surfaces of the holding heads 30, 32. The holding heads 30, 32 may alternatively also comprise a so-called pot shell, i.e. a sleeve-shaped casing of a holding head core, which may consist, for example, of polyetheretherketone (PEEK) or another material compatible with the core material with respect to the thermal expansion coefficient.

FIG. 4 shows a detailed view of the fluid filter 10 according to the detail IV of FIG. 2 in longitudinal section. Note the extent of the fluid inlet region 36 along the longitudinal axis A. This is chosen such that, corresponding to a maximum permissible operating temperature, there is sufficient space for an axial play of the filter cartridge 24 or of the holding head 30.

It can be seen that the sealing ring 40 is seated in a recess 48 of the cover 14. It is located on the filter cartridge 24 and in particular radially circumferentially and sealingly on the holding head 30.

The sealing ring 40 is designed as a pressure-proportional seal. In particular, it has a radially inwardly facing sealing lip 50, with which it abuts the holding head 30. In this exemplary embodiment, the fluid inlet region 36 corresponds to an overpressure region of the fluid filter 10. If the overpressure region is then subjected to pressurized fluid, in particular high-pressure, standing fluid to be filtered, the sealing lip 50 is pressed against the filter cartridge 24 and in this case in particular against the holding head 30, substantially proportionally to the pressure of the fluid. This results in a pressure-proportional seal. The sealing ring may also have more than one sealing lip 50 (in an embodiment not shown in a drawing), for example a radially inwardly extending sealing lip 50 which abuts the filter cartridge and a radially outwardly extending sealing lip which sealingly abuts the housing. In this embodiment, both sealing lips, which form V-shaped legs of the sealing ring in a non-compressed, non-assembled state, can also have the same length. The angle of the V-shaped projecting legs, each forming a sealing lip, can also be the same.

By forming the sealing ring 40 with a sealing lip 50, its contact surface on the holding head 30 is comparatively small. As a result, the sealing ring 40 also forms a radially floating support for the filter cartridge 24 and for the holding head 30; but mainly the lip seal 40 should compensate for relative axial movements. In particular, the filter cartridge 24 is displaceable axially along the longitudinal axis A with its fluid inlet-side end or the holding head 30 within the fluid inlet 36.

A third sealing ring 52 can furthermore be seen in FIG. 4. The third sealing ring 52 is in the form of an O-ring. The third sealing ring 52 is arranged between the housing tube 13 and the inlet cover 14 in an axially sealing manner. It sits in a recess of the housing tube 13.

The sealing ring 40 and the third sealing ring 52 are made of rubber-elastically deformable material, in particular an elastomer.

FIG. 5 shows a detailed view corresponding to FIG. 4 of the retentate outlet region 38 or the marking V of FIG. 2 in longitudinal section. The holding head 32 is arranged on the retentate outlet side, which holding head is radially surrounded by the housing tube 13, and the retentate cover 16 is evident. The retentate outlet region 38 with the retentate outlet 20 is located on the head side of the holding head 32.

By means of the holding head 32 and the sealing ring 42, the permeate collection chamber 34 is also sealed off from the retentate outlet region 38.

In contrast to the sealing ring 40, however, the retentate outlet-side sealing ring 42 contacts both the housing tube 13 and the retentate cover 16 and the holding head 32 of the filter cartridge 24. Due to its press fit, the sealing ring 42 here seals both the retaining head 32 and the filter cartridge 24 circumferentially against the cover 16, both radially. In addition, the sealing ring 42 axially seals the cover 16 against the housing tube 13.

In this embodiment, the sealing ring 42 is formed as an O-ring. It is also made of rubber-elastic material, in particular an elastomer. It is seated in a recess of the retentate outlet cover 16. For sealing pressure of the holding head 32, the contact pressure of the sealing ring 42 is chosen such that the filter cartridge 24 is fixed substantially stationary even in the case of a low operating pressure in the overpressure range or the fluid inlet region 36 (FIG. 2). Thus, the sealing ring 42 forms a fixed support. Together with the sealing ring 40 (FIG. 2), this results in a support of the filter cartridge 24 on the filter housing 12 (FIG. 1) corresponding to a fixed/floating support.

In an alternative embodiment, it is provided that the sealing ring 40 or the sealing ring 42 is seated in a recess of their respective nearest holding head 30, 32 or a recess of the housing tube 13 instead of in the covers 14, 16.

To assemble the fluid filter 10 (see also FIGS. 1 and 2), it is sufficient to successively fit all individual parts on or into one another, in particular in a reversibly detachable manner. For this purpose, first the filter cartridge 24 is inserted into the housing tube 13.

Subsequently, the third sealing ring 52 is inserted laterally into the housing tube 13. Equipped with the sealing rings 40, 42, the covers 14, 16 are then assembled on the end side of the housing tube 13, for example, flanged using the clamps 23. The fluid inlet 18, the retentate outlet 20 and the permeate outlets 22 and the clamps 23 are finally attached to the rest of the filter housing 12 on the outside.

A schematic illustration of a use of the fluid filter 10 according to the invention, for example for concentrating a pharmaceutical precursor and/or intermediate product in a fluid such as a vaccine in a vaccine fluid, is shown in FIG. 6. Of course, the application is not limited thereto; further applications may be in the production of life science products such as cosmetics or in the processing of foodstuffs.

For this example, it is assumed that the fluid to be filtered is an aqueous vaccine mixture to be concentrated. In other words, in this embodiment, the carrier substance is water.

FIG. 6 is a schematic representation of the fluid filter 10 with its fluid inlet 18, the retentate outlet 20 and the permeate outlets 22 combined in this schematic illustration.

In filter operation, the fluid inlet 18 of the fluid filter 10 is acted upon by a fluid F to be filtered. To achieve an optimal filter result, the fluid F is under overpressure, for example 5 bar.

The fluid F is divided into a permeate P and a retentate R in the filter cartridge 24 (FIG. 1) and in particular in its hollow filter bundle 28 (FIG. 1). The permeate initially passes through walls of the hollow fibers of the hollow fiber bundle 28. The permeate P initially collects in the permeate collection chamber 24 (FIG. 1) before it leaves the fluid filter 10 via the permeate outlet 22. By filtering the fluid F to be filtered, the permeate P is depleted of vaccine and, on the other hand, has an increased content of the carrier substance, in this case water.

The retentate R, on the other hand, is concentrated within the filter cartridge 24 and leaves the fluid filter 10 via the retentate outlet 20.

For thermal sterilization, water vapor is introduced into the fluid inlet 18 instead of the fluid F to be filtered in the sterilization mode. In this exemplary embodiment, the pressure of the steam is chosen to be lower than the pressure or overpressure of the fluid F to be filtered in the filter mode. During sterilization, some of the water vapor passes via the filter cartridge 24 to the permeate outlet 22 and another part of the water to the retentate outlet 20. Thus, the fluid filter 10 is sterilized in all its sub-areas by the steam.

Taking a synopsis of all the figures of the drawing, the invention relates in summary in one exemplary embodiment to a thermally sterilizable, in particular steam-sterilizable, fluid filter 10. The fluid filter 10 is particularly suitable for concentrating substances or mixtures of substances, for example pharmaceutical precursors and/or intermediates, in particular vaccines, in a fluid F. The products thus result in a retentate R with increased concentration of substances or mixtures of substances as well as a permeate P, which is depleted in terms of substances or mixtures. The fluid filter 10 has a particularly long service life, even with frequent sterilization. In particular, therefore, a use of the fluid filter for concentrating pharmaceutical precursors and/or intermediates, in particular of vaccines, is proposed. This is achieved by mechanical stresses, in particular thermally induced tensions, for example, on or in a filter cartridge 12 of the fluid filter 10 already being constructively avoided or at least reduced.

For this purpose, the fluid filter 10 has a filter housing 12 with an inlet cover 14 and a retentate outlet cover 16 and a housing tube 13 arranged between the covers 14, 16. The fluid filter 10 has a fluid inlet 18 with a fluid inlet region 36, a retentate outlet 20 with a retentate outlet region 38 and one or more permeate outlets 22 that are fluidly connected to a permeate collection chamber 34.

The filter housing 12 forms an interior, in which the filter cartridge 24 is arranged, in particular centrally along a longitudinal axis A of the filter housing 12. The filter cartridge 24 comprises a filter medium 26, which is delimited by two holding heads 30, 32 formed of plastic, in and between which a hollow fiber bundle 28, in this embodiment a ceramic hollow fiber bundle, is arranged. The hollow fiber bundle 28 forms passage openings 46 in the holding heads 30, 32.

Sealing rings 40, 42 formed as O-rings are arranged in the covers 14, 16. In particular, the sealing ring 40 is seated in a recess 48 of the inlet cover 14. The sealing ring 40 provided with an inner side sealing lip 50 seals the holding head 30 radially against the filter housing 12, in particular in a pressure-assisted manner. By contrast, the sealing ring 42 seals both radially its associated holding head 32 against the cover 16 and the cover 16 axially against the housing tube 13. A third sealing ring 52 seals the opposing inlet cover 14 against the housing tube 13.

Overall, the sealing rings 40, 42 form a kind of fixed/floating support of the filter cartridge 24 in the filter housing 12, so that the filter cartridge 24 has axial play to compensate for thermally induced changes in length.

As an alternative to the flow-through variant/operating mode shown in FIG. 6, a so-called dead-end filtration can, of course, also be carried out with the fluid filter according to the invention: for this purpose, the filter cartridge, in particular the ceramic hollow fibers, would be closed at an end facing away from the fluid inlet, so that either a valuable or harmful product would be retained within the filter cartridge. However, with respect to the permeate outlet, this additional embodiment is not different; the main difference is that no fluid outlet (retentate outlet) must be provided.

FIG. 7 shows a fluid filter 10 according to a further embodiment. Functionally, this does not differ from the variants described above. Significant differences exist, however, in terms of support/sealing of the filter cartridge 24 relative to the filter housing 12. Here, radial play is present, which has the width s, between the filter housing 12 (more precisely, both between the housing tube 13 and the covers 14, 16) and the holding heads 30, 32 of the filter cartridge 24. Via this comparatively wide gap s, manufacturing tolerances of the filter cartridge 24 can be compensated with respect to axial offset/concentricity, without a tension/restraint being at risk. Furthermore, angle deviations can also be easily compensated; the filter cartridge has a slightly tilted mounting position in this case. This is particularly important when using ceramic hollow fiber bundles 28 as the filter medium 26.

In order to prevent, in particular in case of a horizontal installation position, that support forces which are too strong act on the sealing lip 50 of the sealing ring 40, which support forces can, over time, lead to there being no effective seal, a retaining ring 60 is provided at both ends, which comprises a plurality of radially outwardly extending retaining bulges 61 distributed over its circumference, which retaining bulges in turn are supported on a retaining region on the lateral surface of the holding heads 30, 32.

The retaining ring 60 may optionally be an O-ring made of a plastic material, e.g. an elastomer, wherein the retaining bulges 61 are formed as nubs. This is shown in FIG. 8. Due to the merely punctiform/linear contact or the very small contact surface between retaining bulges 61 and retaining head 30, 32, it is achieved that the holding heads 30, 32 can be displaced axially with relatively little friction in spite of the radial guidance; this is important in order to be able to compensate for relative length expansions between filter cartridge 24 and filter housing 12, in particular during thermal sterilization.

FIG. 9 shows a side view of the fluid filter from FIG. 7. Here the clamp 23 can be seen which connects the cover 14 with the housing tube 13, which is closable in this exemplary embodiment by a wing nut. Furthermore, the passage openings 46 of the hollow fiber bundle 28 can be seen through the holding head 32.

FIG. 10 shows a filter cartridge 24 of a fluid filter according to a further embodiment. The filter cartridge 24 per se corresponds in its construction to the variants described above. A difference with respect to FIG. 7 is with regard to the design of the retaining ring 60, which here is a spring ring made of a preferably metallic material, in particular stainless steel. The retaining bulges 61 are formed in the form of radially inwardly directed concave bulges. The bulges are preferably distributed over the circumference at a regular distance, wherein in each case between two circumferentially adjacent concave bulges non-bulging connecting portions are provided, in each of which a radially outwardly directed support pin 62 is arranged, which in turn allows the smallest possible contact with the inner lateral surface of the filter housing.

The section of a longitudinal section of a fluid filter 24, which is shown in FIG. 11, again differs from the construction of the retaining ring 60 from the variants described above. The retaining ring 60 has in the present case a radially inner, continuous, circumferential, sleeve-shaped support region 63, which is supported in a retaining region of the holding head 30. Furthermore, the retaining ring has spring tongues which form the retaining bulges 61 and which extend from the support region on both sides in the axial direction and radially inwardly and are designed to abut the inner lateral surface of the filter housing 12, in particular of the housing tube 13. The operation of the sealing ring 40 with sealing lip 50 differs in this case just as little from the above-described variants as the effect of the sealing ring 52, which in turn seals the cover 14 axially relative to the housing tube 13. Reference is further made to FIG. 12, which shows the section B-B according to FIG. 11.

Through all variants of the retaining ring described herein, it is advantageously achieved (in particular in cooperation with the gap s) on the one hand that production-related position tolerances with respect to concentricity, parallelism and angularity of the two holding heads 30, 32 of the filter cartridge can be compensated for without loading the lip seal 50 in a horizontal installation position. On the other hand, it is ensured that, due to the small area contact of the retaining ring 60 with the holding heads 30, 32 and/or the filter housing 12, a simple, i.e. low-friction, axial mobility of the filter cartridge relative to the filter housing 12 is possible, in particular to compensate for relative thermal length expansions.

In FIGS. 13-17, some other embodiments of retaining rings 60 are shown, which are configured as spring rings made of metal. These each comprise a complete slot 64, which offers advantages for ease of assembly as well as for simple and cost-effective production; furthermore, a diameter compensation in the largest possible diameter range can be achieved. The spring rings can be made of a strip material, wherein the retaining bulges, which are present here in the form of spring tongues 65, are obtained by punching and bending. Depending on the embodiment, the spring tongues 65 can extend radially inwardly and/or radially outwardly, wherein combinations are also possible. In the embodiment of the retaining ring of FIG. 13b, which corresponds to that shown in the assembly of FIG. 10, radially outwardly directed support pins 62 are also provided, which are respectively present in connecting portions between inwardly bulged portions of the retaining ring 60.

What is claimed is:

1. A thermally sterilizable fluid filter (10), for the purification of substances contained in a fluid (F) by means of a micro-, nano- or ultrafiltration of the fluid, the fluid filter comprising:
    a filter housing (12) having:
        a fluid inlet (18);
        a permeate collection chamber having a permeate outlet (22);
        a retentate outlet (20); and
    a filter cartridge (24) arranged within the filter housing (12) and extending in an axial direction to a longitudinal axis (A) of the filter housing (12), the filter cartridge comprising:
        a filter medium (26) of a ceramic material or a ceramic composite material; and
        at least one rubber-elastically deformable sealing ring (40, 42, 52) which abuts the filter cartridge (24) circumferentially sealingly in the radial direction and over which the filter cartridge (24) is held with axial play on the filter housing (12);
    wherein an overpressure range of the fluid filter (10) when pressurized with the fluid (F) is sealed against the permeate collection chamber (34) by the at least one sealing ring (40, 42, 52);
    wherein the permeate collection chamber engages around the filter cartridge (24) in the radial direction on an outside and/or engages through the filter cartridge (24);
    wherein a sealing ring of the at least one sealing ring (40, 42, 52) associated with the fluid inlet (18), comprises
        a sealing lip (50) which is pressed by the fluid (F) against the filter cartridge (24) pressure-proportional to an operating pressure of the fluid (F) prevailing in the overpressure range of the fluid filter (10);
    wherein adjacent to the sealing ring (40, 42, 52) with sealing lip (50), a retaining ring (60) is arranged radially between the filter housing (12) and the filter cartridge (24);
    wherein the retaining ring (60) comprises
        a plurality of retaining bulges (61) distributed over a circumference, the plurality of retaining bulges extending from a first radius to a second radius;
        wherein the retaining ring is supported radially inward in a retaining region on an outer circumferential surface of the filter cartridge (24) and radially outwardly to abut the filter housing (12);
    wherein the retaining bulges (61) extend radially inward to an inner circumference, the diameter of which in a non-compressed non-assembled state is equal to or greater than a diameter of the filter cartridge (24) in the retaining region; or
    the retaining bulges (61) extend radially inward to an inner circumference, the diameter of which in an non-compressed non-assembled state is equal to or smaller than a diameter of the filter cartridge (24) in the retaining region;
    wherein the retaining ring (60) is a metallic spring ring and the retaining bulges (61) are designed as spring tongues (65) and which has a slot (64) having an open cross-section.

2. The fluid filter according to claim 1, wherein
an annular gap is present radially between the filter cartridge (24) and the filter housing (12) in a region in which the sealing ring (40, 42, 52) sealingly abuts the filter cartridge (24);
wherein the annular gap has a width between 0.4 mm to 1.5 mm.

3. The fluid filter according to claim 1, wherein
the at least one sealing ring (40, 42, 52) comprises an elastomer.

4. The fluid filter according to claim 1, wherein
the fluid filter comprises at least one second sealing ring, which sealingly abuts the filter cartridge (24) in the radial direction and over which the filter cartridge (24) is arranged held on the filter housing (12).

5. The fluid filter according to claim 1, wherein
the filter housing (12) includes:
    a sleeve-shaped or pot-shaped housing part with a first end-side housing opening; and
    a cover (14, 16) is arranged at the housing opening.

6. The fluid filter according to claim 4, wherein
the housing part is sleeve-shaped and has an end-side housing opening at both ends of the housing part;
wherein a cover (14, 16) is arranged on each of the two housing openings.

7. The fluid filter according to claim 6, wherein
at least one of the two sealing rings (40, 42, 52) is arranged in sections between the housing part and one of the covers (14, 16) and sealingly abuts the cover (14, 16) and sealing abuts on the housing part in the axial and/or radial direction, and/or
the retaining ring is arranged between the housing part and one of the two covers (14, 16) and sealingly abuts the cover (14, 16) and the housing part in the axial and/or radial direction.

8. The fluid filter according to claim 7, wherein
a third sealing ring (40, 42, 52) is arranged axially sealingly between the housing part and the cover (14, 16) associated with the fluid inlet (14, 16).

9. The fluid filter according to claim 1, wherein the sealing rings (40, 42, 52) and/or a base of the retaining ring (60) is designed as an O-ring.

10. The fluid filter according to claim 1, wherein
the filter cartridge (24) comprises a ceramic hollow fiber bundle.

11. The fluid filter according to claim 10, wherein
the hollow-fiber bundle (28) is fixed to or arranged in at least one holding head (30, 32), at least at one end of the hollow-fiber bundle (28);
wherein the sealing ring (40, 42, 52) circumferentially sealingly abuts the at least one holding head (30, 32) in the radial direction and allows an axial clearance of the at least one holding head (30, 32) relative to the filter housing (12); and
wherein the retaining region in which the retaining ring (60) with its bulges (61) abuts the filter cartridge (24), is present on the at least one holding head (30, 32).

12. The fluid filter according to claim 11, wherein
the at least one holding head (30, 32) is formed of a plastic material of epoxy resin or polyurethane.

13. The fluid filter according to claim 11, wherein at least one holding head (30, 32) seals the permeate collection chamber (24) against the fluid inlet (18) and/or against the retentate outlet (20).

14. The fluid filter according to claim 1, wherein
the filter housing (12) consists wholly or partly of stainless steel.

15. The fluid filter according to claim 1, wherein
the fluid filter is configured and adapted for concentrating a pharmaceutical precursor and/or intermediate product, or a vaccine, in a fluid for processing foods and/or for producing life science products.

16. A thermally sterilizable fluid filter (10), for the purification of substances contained in a fluid (F) by means of a micro-, nano- or ultrafiltration of the fluid, the fluid filter comprising:
   a filter housing (12) having:
      a fluid inlet (18);
      a permeate collection chamber having a permeate outlet (22);
      a retentate outlet (20); and
   a filter cartridge (24) arranged within the filter housing (12) and extending in an axial direction to a longitudinal axis (A) of the filter housing (12), the filter cartridge comprising:
      a filter medium (26) formed as a ceramic hollow fiber bundle of a ceramic material or a ceramic composite material; and
      a holding head attached to at least one end of the ceramic hollow fiber bundle;
   at least one rubber-elastically deformable sealing ring (40, 42, 52) which sealingly abuts the holding head circumferentially, circumferentially sealingly in the radial direction against the filter housing while supporting the holding head in the filter housing in the radial direction, the at least one rubber-elastically deformable sealing ring enabling axial movement of the holding head relative to the filter housing;
   wherein an overpressure range of the fluid filter (10) when pressurized with the fluid (F) is sealed against the permeate collection chamber (34) by the at least one sealing ring (40, 42, 52);
   wherein the permeate collection chamber engages around the filter cartridge (24) in the radial direction on an outside and/or engages through the filter cartridge (24);
   wherein a sealing ring of the at least one sealing ring (40, 42, 52) associated with the fluid inlet (18), comprises
      a sealing lip (50) which is pressed by the fluid (F) against the filter cartridge (24) pressure-proportional to an operating pressure of the fluid (F) prevailing in the overpressure range of the fluid filter (10);
   wherein adjacent to the sealing ring (40, 42, 52) with sealing lip (50), a retaining ring (60) is arranged radially between the filter housing (12) and the filter cartridge (24);
   wherein the retaining ring (60) comprises
      a plurality of retaining bulges (61) distributed over a circumference of the retaining ring (60), the plurality of retaining bulges extending from a first radius to a second radius;
      wherein the retaining ring is supported radially inward on a retaining region of an outer circumferential surface of the filter cartridge (24) and radially outwardly to abut the filter housing (12);
   wherein the retaining bulges (61) are spring tongues;
   wherein the retaining bulges (61) extend radially inward to an inner circumference, the diameter of which in a non-compressed non-assembled state is equal to or greater than a diameter of the filter cartridge (24) in the retaining region; or
   the retaining bulges (61) extend radially inward to an inner circumference, the diameter of which in a non-compressed non-assembled state is equal to or smaller than a diameter of the filter cartridge (24) in the retaining region.

17. The fluid filter according to claim 16, wherein
the filter housing (12) includes:
   a sleeve-shaped or pot-shaped housing part with a first end-side housing opening; and
   a cover (14, 16) is arranged at the housing opening.

* * * * *